(12) United States Patent
Griesemer et al.

(10) Patent No.: US 9,886,373 B2
(45) Date of Patent: *Feb. 6, 2018

(54) TESTING CODE RESPONSE TO INJECTED PROCESSING ERRORS

(71) Applicant: International Business Machines Corporation, Armonk, NY (US)

(72) Inventors: Joseph A. Griesemer, Poughkeepsie, NY (US); Steven M. Partlow, Beacon, NY (US); David A. Stilwell, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/273,755

(22) Filed: Sep. 23, 2016

(65) Prior Publication Data

US 2017/0091084 A1 Mar. 30, 2017

Related U.S. Application Data

(63) Continuation of application No. 15/143,667, filed on May 2, 2016, now Pat. No. 9,542,301, which is a continuation of application No. 14/867,118, filed on Sep. 28, 2015.

(51) Int. Cl.
*G06F 9/44* (2006.01)
*G06F 11/36* (2006.01)

(52) U.S. Cl.
CPC ........ *G06F 11/3688* (2013.01); *G06F 9/4425* (2013.01); *G06F 11/36* (2013.01); *G06F 11/3636* (2013.01); *G06F 11/3644* (2013.01); *G06F 11/3664* (2013.01); *G06F 11/3672* (2013.01)

(58) Field of Classification Search
USPC .......................................................... 717/129
See application file for complete search history.

(56) References Cited

U.S. PATENT DOCUMENTS

| | | | |
|---|---|---|---|
| 5,671,352 A | 9/1997 | Subrahmaniam et al. | |
| 6,042,006 A | 3/2000 | Van Tilburg et al. | |
| 6,077,312 A | 6/2000 | Bates et al. | |
| 6,145,123 A | 11/2000 | Torrey et al. | |
| 6,279,104 B1 * | 8/2001 | Sato ...................... | G06F 11/362 |
| | | | 712/227 |

(Continued)

FOREIGN PATENT DOCUMENTS

WO 2015079291 A1 6/2015

OTHER PUBLICATIONS

Griesemer et al., "Testing Code Response to Injected Processing Errors", U.S. Appl. No. 15/343,256, filed Nov. 4, 2016, 32 pages.

(Continued)

*Primary Examiner* — Francisco Aponte
(74) *Attorney, Agent, or Firm* — Lance I. Hochhauser; Isaac J. Gooshaw

(57) ABSTRACT

More robust testing of computer module responses to processing errors using a flexible, lightweight solution that does not alter the computer module. Through modification of processing pointers, a wide variety of processing errors and delays are injected into a computer module without modifying the computer module.

1 Claim, 3 Drawing Sheets

(56) References Cited

U.S. PATENT DOCUMENTS

| | | |
|---|---|---|
| 6,321,290 B1 | 11/2001 | Yamashita |
| 6,839,893 B2 | 1/2005 | Bates et al. |
| 6,938,055 B2 | 8/2005 | Iida et al. |
| 7,055,078 B2 | 5/2006 | Kwon |
| 7,225,431 B2 | 5/2007 | Gschwind et al. |
| 7,392,507 B2 | 6/2008 | Kolawa et al. |
| 7,398,469 B2 | 7/2008 | Kisamore et al. |
| 7,617,375 B2 | 11/2009 | Flemming et al. |
| 7,774,172 B1 | 8/2010 | Yunt et al. |
| 7,840,845 B2 | 11/2010 | Doddapaneni et al. |
| 7,950,001 B2 | 5/2011 | Panchamukhi et al. |
| 7,962,803 B2 * | 6/2011 | Huber ............... G06F 11/0709 714/37 |
| 8,060,221 B2 | 11/2011 | Sakagami et al. |
| 8,091,075 B2 | 1/2012 | Bates et al. |
| 8,122,203 B2 | 2/2012 | Huber et al. |
| 8,131,523 B1 | 3/2012 | Yunt et al. |
| 8,555,256 B2 | 10/2013 | Liu et al. |
| 8,566,799 B2 | 10/2013 | Bates |
| 8,589,879 B2 | 11/2013 | Suzuki et al. |
| 8,621,434 B2 | 12/2013 | Campion et al. |
| 8,752,024 B2 | 6/2014 | Bates |
| 8,813,038 B2 | 8/2014 | Erickson et al. |
| 8,826,243 B2 * | 9/2014 | Dearing ............. G06F 11/3632 717/124 |
| 8,959,491 B2 * | 2/2015 | Dearing ............. G06F 11/3632 717/130 |
| 8,997,059 B2 | 3/2015 | Wang et al. |
| 9,104,805 B1 | 8/2015 | Yunt et al. |
| 9,292,417 B2 | 3/2016 | Salsamendi |
| 9,317,408 B2 | 4/2016 | Szpak |
| 9,417,987 B2 | 8/2016 | Vaidyanathan et al. |
| 2004/0083458 A1 | 4/2004 | Gschwind et al. |
| 2004/0243882 A1 * | 12/2004 | Zhou ..................... G06F 11/36 714/38.1 |
| 2004/0268315 A1 | 12/2004 | Gouriou et al. |
| 2006/0070039 A1 | 3/2006 | Bates et al. |
| 2007/0101327 A1 | 5/2007 | Burdick et al. |
| 2008/0005193 A1 | 1/2008 | Lev et al. |
| 2008/0148237 A1 | 6/2008 | Jiang et al. |
| 2008/0168428 A1 | 7/2008 | Bates et al. |
| 2008/0215925 A1 * | 9/2008 | Degenaro ............ G06F 11/263 714/41 |
| 2008/0244243 A1 | 10/2008 | Kalra |
| 2010/0287535 A1 | 11/2010 | Kim et al. |
| 2011/0154111 A1 | 6/2011 | Beilmann et al. |
| 2013/0305373 A1 | 11/2013 | Lim et al. |
| 2013/0318504 A1 | 11/2013 | Eker et al. |
| 2014/0013164 A1 | 1/2014 | Ma et al. |
| 2014/0289564 A1 | 9/2014 | Rugina et al. |
| 2015/0212923 A1 | 7/2015 | Sugiyama et al. |
| 2016/0124834 A1 | 5/2016 | Davis et al. |
| 2016/0124835 A1 | 5/2016 | Davis |
| 2016/0274998 A1 | 9/2016 | Coyle et al. |

OTHER PUBLICATIONS

IBM, Appendix P, List of IBM Patents or Patent Applications Treated as Related, dated Nov. 7, 2016, 2 pages.

Bieman et al., "Using fault injection to increase software test coverage", Proc. International Symposium on Software Reliability (ISSRE'96), Oct. 30-Nov. 2, 1996, © 1996, IEEE, pp. 166-174.

Griesemer et al., "Testing Code Response to Injected Processing Errors", U.S. Appl. No. 14/867,118, filed Sep. 28, 2015, 35 pages.

Griesemer et al., "Testing Code Response to Injected Processing Errors", U.S. Appl. No. 15/143,667, filed May 2, 2016, 31 pages.

Gupta et al., "Locating Faulty Code Using Failure-Inducing Chops", ASE'05, Nov. 7-11, 2005, Long Beach, California, USA, pp. 263-272, Copyright ACM 1-58113-994-4/05/0011.

Iyer et al., "Fault Injection", Encyclopedia of Software Engineering, DOI: 10.1081/E-ESE-120044235, pp. 287-299, Copyright © 2011 by Taylor and Francis.

Little, Patty, "z/OS Systems Programming & zNextGen", IBM Corporation, SLIP Trap Bootcamp, Session 17090, Mar. 3, 2015, SHARE Seattle, pp. 1-34.

McIravy et al.; "Dynamic Setup of SLIP PER Traps"; An IP.com Prior Art Database Technical Disclosure; Electronic Publication: Mar. 19, 2005; IP.com No. 000105478; Original Disclosure Information: TDB v36 n8 08-93, p. 133-134.

"Performance considerations for designing a SLIP trap"; IBM Knowledge Center; Printed on: May 26, 2015; pp. 1-4; <http://www-01.ibm.com/support/knowledgecenter/SSLTBW_2.1.0/com.ibm.zos.v2r1.ieag100/iea3g1_Keeping_PER_traps_from_slowing_system_performance.htm>.

IBM, Appendix P, List of IBM Patents or Patent Applications Treated as Related, 2 pages, dated Oct. 4, 2016.

* cited by examiner

TESTING CODE RESPONSE TO INJECTED PROCESSING ERRORS

BACKGROUND

The present invention relates generally to the field of software development, and more particularly to testing or debugging software.

Testing software involves verifying that the software behaves correctly in error situations. To properly recreate error situations, a user needs to inject an error or to create a timing delay. One conventional manner of recreating error situations is to add a custom scaffolding to a module (also sometimes called a program or a computer code) being tested. A custom scaffold is test code that can be removed after testing. However, removing the custom scaffold alters the module (in size and processing flow) and can affect the behavior of the module. Similar to a custom scaffold, permanent test code is added to a module. Permanent test code can be activated (for testing) or deactivated (for production) by altering configuration options. Permanent test code increases the size of the module and can slow performance of the module. Additionally, both a custom scaffold and permanent test code require advanced knowledge of where testing or debugging is required within a module. A third manner of recreating error situations is virtualization. However, virtualization does not test the module on actual hardware, only virtual hardware.

SUMMARY

According to an aspect of the present invention, there is a method, computer program product, and/or system that performs the following operations (not necessarily in the following order): (i) determining that processing a first computer module triggers a breakpoint; (ii) responsive to determining that processing the first computer module triggers the breakpoint, moving processing from the first computer module to a second computer module; and (iii) returning processing to the first computer module from the second computer module. At least determining that processing the first computer module triggers the breakpoint is performed by computer software running on computer hardware.

DETAILED DESCRIPTION

Figure 1:
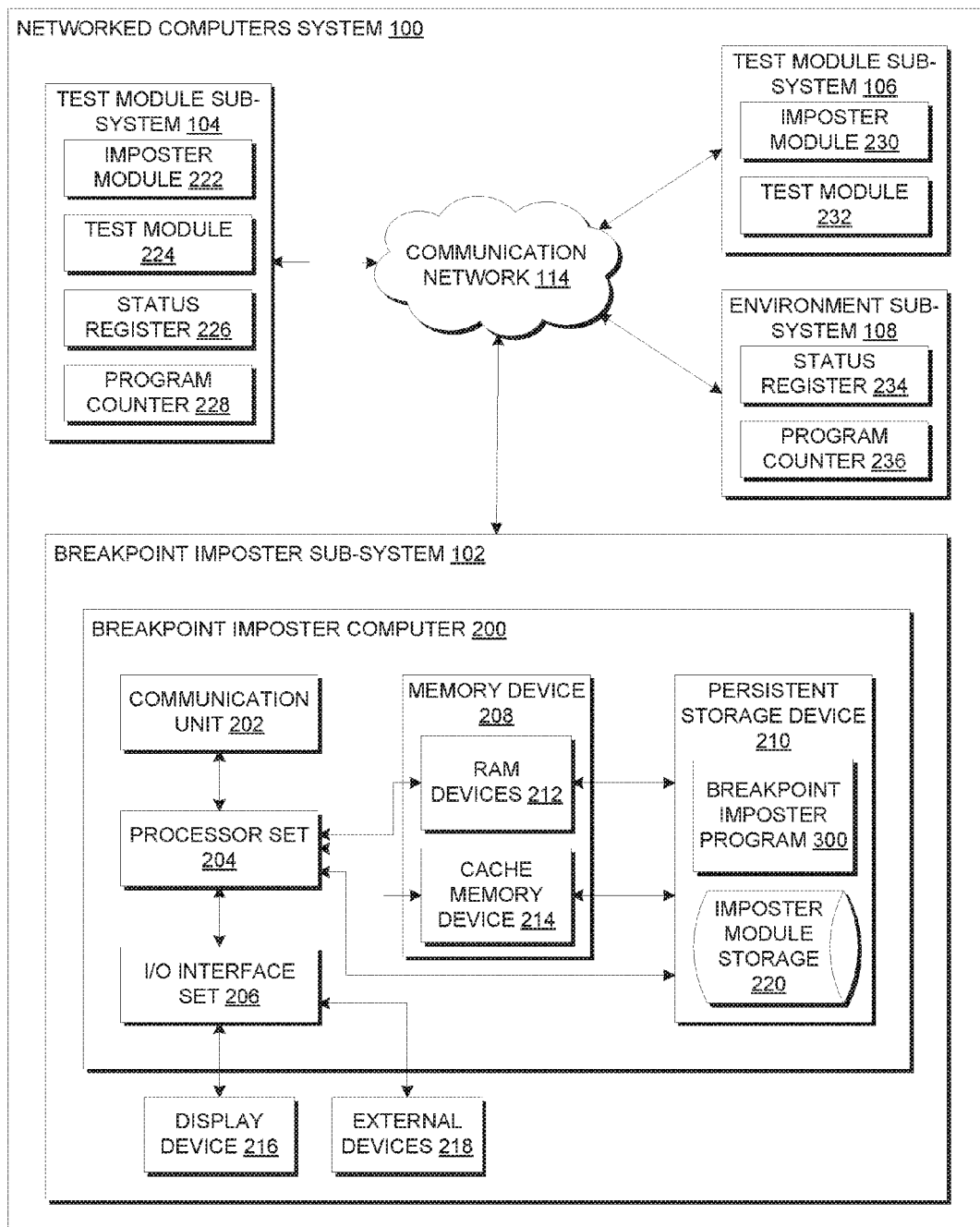
FIG. 1 is a block diagram view of a first embodiment of a system according to the present invention.

More robust testing of computer module responses to processing errors using a flexible, lightweight solution that does not alter the computer module. Through modification of processing pointers, a wide variety of processing errors and delays are injected into a computer module without modifying the computer module. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: breakpoint imposter sub-system 102; test module sub-systems 104, 106; environment sub-system 108; and communication network 114. Breakpoint imposter sub-system 102 contains: breakpoint imposter computer 200; display device 216; and external devices 218. Breakpoint imposter computer 200 contains: communication unit 202; processor set 204; input/output (I/O) interface set 206; memory device 208; and persistent storage device 210. Memory device 208 contains: random access memory (RAM) devices 212; and cache memory device 214. Persistent storage device 210 contains: imposter module storage 220; and breakpoint imposter program 300. Test module sub-system 104 contains: imposter module 222; test module 224; status register 226; and program counter 228. Test module sub-system 106 contains: imposter module 230; and test module 232. Environment sub-system 108 contains: status register 234; and program counter 236.

Breakpoint imposter sub-system 102 is, in many respects, representative of the various computer sub-systems in the present invention. Accordingly, several portions of breakpoint imposter sub-system 102 will now be discussed in the following paragraphs.

Breakpoint imposter sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Breakpoint imposter program 300 is a collection of machine-readable instructions and/or data that is used to create, manage, and control certain software functions that will be discussed in detail, below, in the Example Embodiment sub-section of this Detailed Description section.

Breakpoint imposter sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between breakpoint imposter sub-system 102 and client sub-systems.

Breakpoint imposter sub-system 102 is shown as a block diagram with many double arrows. These double arrows (no separate reference numerals) represent a communications fabric, which provides communications between various components of breakpoint imposter sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer-readable storage media. In general, memory device 208 can include any suitable volatile or non-volatile computer-readable storage media. It is further noted that, now and/or in the near future: (i) external devices 218 may be able to supply some, or all, memory for breakpoint imposter sub-system 102; and/or (ii) devices external to breakpoint imposter sub-system 102 may be able to provide memory for breakpoint imposter sub-system 102.

Breakpoint imposter program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 210.

Breakpoint imposter program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer-readable storage medium that is also part of persistent storage device 210.

Communication unit 202, in these examples, provides for communications with other data processing systems or devices external to breakpoint imposter sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with breakpoint imposter computer 200. For example, I/O interface set 206 provides a connection to external devices 218. External devices 218 will typically include devices such as a keyboard, a keypad, a touch screen, and/or some other suitable input device. External devices 218 can also include portable computer-readable storage media such as, for example, thumb drives, portable optical or magnetic disks, and memory cards. Software and data used to practice embodiments of the present invention (e.g., breakpoint imposter program 300) can be stored on such portable computer-readable storage media. In these embodiments the relevant software may (or may not) be loaded, in whole or in part, onto persistent storage device 210 via I/O interface set 206. I/O interface set 206 also connects in data communication with display device 216.

Display device 216 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
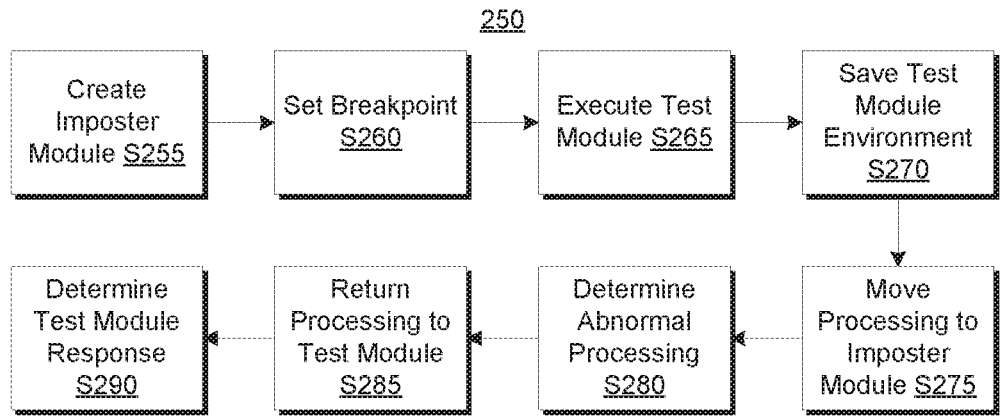
FIG. 2 is a flowchart showing a first embodiment method performed, at least in part, by the first embodiment system.
Figure 3:
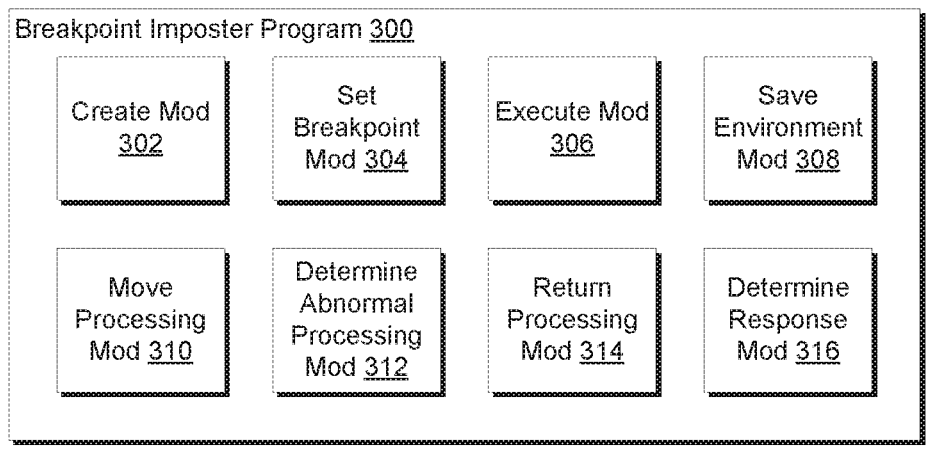
FIG. 3 is a block diagram view of a machine logic (e.g., software) portion of the first embodiment system.

FIG. 2 shows flowchart 250 depicting a method according to the present invention. FIG. 3 shows breakpoint imposter program 300, which performs at least some of the method operations of flowchart 250. This method and associated software will now be discussed, over the course of the following paragraphs, with extensive reference to FIG. 2 (for the method operation blocks) and FIG. 3 (for the software blocks). In this example a user implements breakpoint imposter sub-system 102 to analyze test module 224.

Processing begins at operation S255, where create module (mod) 302 creates an imposter module. An imposter module is sometimes also called a second computer module or an injected module. In this example, create mod 302 creates imposter module 222. Imposter module 222 is a piece of code that causes an abnormal processing situation. Here, imposter module 222 contains instructions to obtain and not free storage. By not freeing storage, imposter module 222 can cause the storage to become full, resulting in an insufficient storage error or abnormal termination (ABEND). An abnormal termination is sometimes also called an abnormal end. Alternatively, imposter module 222 includes a processing delay. By introducing a processing delay, imposter module 222 can also cause an insufficient storage ABEND. For example, if imposter module 222 delays processing a state of a system can change and can result in an unexpected error. In some embodiments of the present invention, imposter module 222 contains a variety of lines of code to introduce various abnormal processing situation. In some embodiments of the present invention, imposter module 222 introduces multiple abnormal processing situation. In some embodiments of the present invention, an abnormal processing situation includes, but is not limited to: (i) changing a storage reference; and/or (ii) changing a register reference. In some embodiments of the present invention, create mod 302 creates imposter module 222 to test (or inject) a variety of errors.

In some embodiments of the present invention, create mod 302 creates imposter module 222 in imposter module storage 220. In some embodiments of the present invention, create mod 302 creates imposter module 222 in test module sub-system 104. In some embodiments of the present invention, create mod 302 creates imposter module 230 in imposter module storage 220 and moves imposter module 230 to test module sub-system 106.

Processing proceeds to operation S260, where set breakpoint mod 304 sets a breakpoint. A breakpoint is sometimes also known as a trap, an interrupt, a watchpoint, a pause, a serviceability level indication processing (SLIP) trap, a SLIP program event recording (PER) trap, a PER SLIP trap, or a non-PER SLIP trap. In this example, a breakpoint monitors for a hardware event, specifically a line of code in test module 224 to release storage. In some embodiments of the present invention, breakpoint mod 304 sets a plurality of breakpoints. In some embodiments of the present invention, various breakpoints correlate to various imposter modules in imposter module storage 220. Alternatively, various breakpoints correlate to various lines of code within imposter module 222.

Processing proceeds to operation S265, where execute mod 306 executes a test module. A test module is a module being tested. A test module is sometimes also known as a first computer module, a product module, a production module, or an intercepted module. In this example, execute mod 306 executes test module 224. Execution of code is sometimes also known as processing. Here, execution of test module 224 continues until a line of code in test module 224 triggers a breakpoint. Triggering a breakpoint is sometimes also called intercepting. In this example, test module 224 contains a line of code to release allocated storage, and that line of code triggers the breakpoint.

Processing proceeds to operation S270, where save environment mod 308 saves an environment corresponding to a test module. In this example, save environment mod 308 saves an addressing mode and/or a set of registers corresponding to test module 224. Here, save environment mod 308 saves an addressing mode and a set of registers for test module 224 to status register 226 and program counter 228. Alternatively, save environment mod 308 saves and addressing mode and a set of registers for test module 232 (on test module sub-system 106) to status register 234 and program counter 236 (on environment sub-system 108). A status register and a program counter are sometimes also called one or more of a linkage stack, a program counter, or a branch and stack register (BAKR). In some embodiments of the present invention, saving an environment, save environment mod 308 overlays a new status register over an existing status register in status register 226 and/or overlays a new program counter over an existing program counter in program counter 228.

Processing proceeds to operation S275, where move processing mod 310 moves processing to an imposter module. A breakpoint sometimes causes processing to continue in a second environment. A breakpoint sometimes applying supervisory code to continue processing; for example, running disabled to external interrupts. In some embodiments of the present invention, move processing mod 310 stops a breakpoint from continuing processing in a second environment and/or from applying supervisory code. In some embodiments of the present invention, move processing mod 310 moves processing in response to a line of code in test module 224 triggering a breakpoint. In this example, move processing mod 310 moves processing from test module 224 to imposter module 222. Here, move processing mod 310 uses status register 226 and program counter 228 to retain the environment of test module 224. In some embodiments of the present invention, move processing mod 310 drops a set of locks, enables input output, and/or restores a set of registers.

Processing proceeds to operation S280, where determine abnormal processing mod 312 determines that an abnormal processing situation occurs during processing of an imposter module. An abnormal processing situation can be, but is not limited to: an abnormal termination (ABEND); a warning; a service message; an error message; and/or any incorrect behavior (e.g., lack of an error message, lack of proper diagnostics, etc.). In some embodiments of the present invention, determine abnormal processing mod 312 traces an abnormal processing situation, signals other code, and/or displays data. In this example, determine abnormal processing mod 312 determines an abnormal processing situation associated with processing of imposter module 222. Determine abnormal processing mod 312 determines that imposter module 222 causes an insufficient storage ABEND. Other ABENDs include, but are not limited to: insufficient memory; divide by zero; and/or out of time. In some embodiments of the present invention, determine abnormal processing mod 312 determines that imposter module 222 causes a plurality of abnormal processing situations.

Processing proceeds to operation S285, where return processing mod 314 returns processing to a test module. Return processing mod 314 continues processing from an imposter module to a test module in a similar fashion to move processing mod 310. In some embodiments of the present invention, return processing mod 314 recreates an environment of test module 224 using status register 226 and/or program counter 228. In this example, return processing mod 314 returns processing from imposter module 222 to test module 224 at a line of code that triggered a breakpoint in operation S265. Alternatively, return processing mod 314 causes processing to continue on a line of code subsequent to a line of code that triggered a breakpoint in operation S265. In further alternative embodiments, return processing mod 314 causes processing to continue on a recovery code within test module 224.

Processing terminates at operation S290, where determine response mod 316 determines a test module response to an abnormal processing situation. In this example, determine response mod determines how test module 224 responds to an abnormal processing situation determined in operation S280. In some embodiments of the present invention, determine response mod 316 determines that test module 224 properly issues a response to an abnormal processing situation. Alternatively, determine response mod 316 determines that test module 224 fails to respond properly to an ABEND. In some embodiments of the present invention, determine response mod 316 transmits a message to a user indicating a response from test module 224.

III. Further Comments and/or Embodiments

Some embodiments of the present invention recognize the following facts, potential problems, and/or potential areas for improvement with respect to the current state of the art: (i) debugging code is critical to commercial viability; (ii) conventional methods of recreating error situation have drawbacks; (iii) a breakpoint cannot operate on a subset of storage; and/or (iv) a breakpoint can only perform a limited set of functions. For example, some breakpoints cannot execute a wait function and/or cannot modify storage paged out to a disk.

Conventional debugging of a computer code generally includes: (i) executing a test module; and/or (ii) verifying expected results of the test module. Executing a test module is sometimes also known as starting, calling, signaling, or processing the test module.

Conventional debugging of a computer code using a breakpoint generally includes: (i) setting a breakpoint; (ii) executing a test module; (iii) determining that a breakpoint is triggered; (iv) determining whether an action is taken; (v) taking an action (e.g., modifying a register, modifying storage, etc.); (vi) resuming processing of a test module; (vii) encountering an abnormal processing situation; (viii) executing recovery code for a test module; and/or (ix) verifying expected results of a test module.

Figure 4:
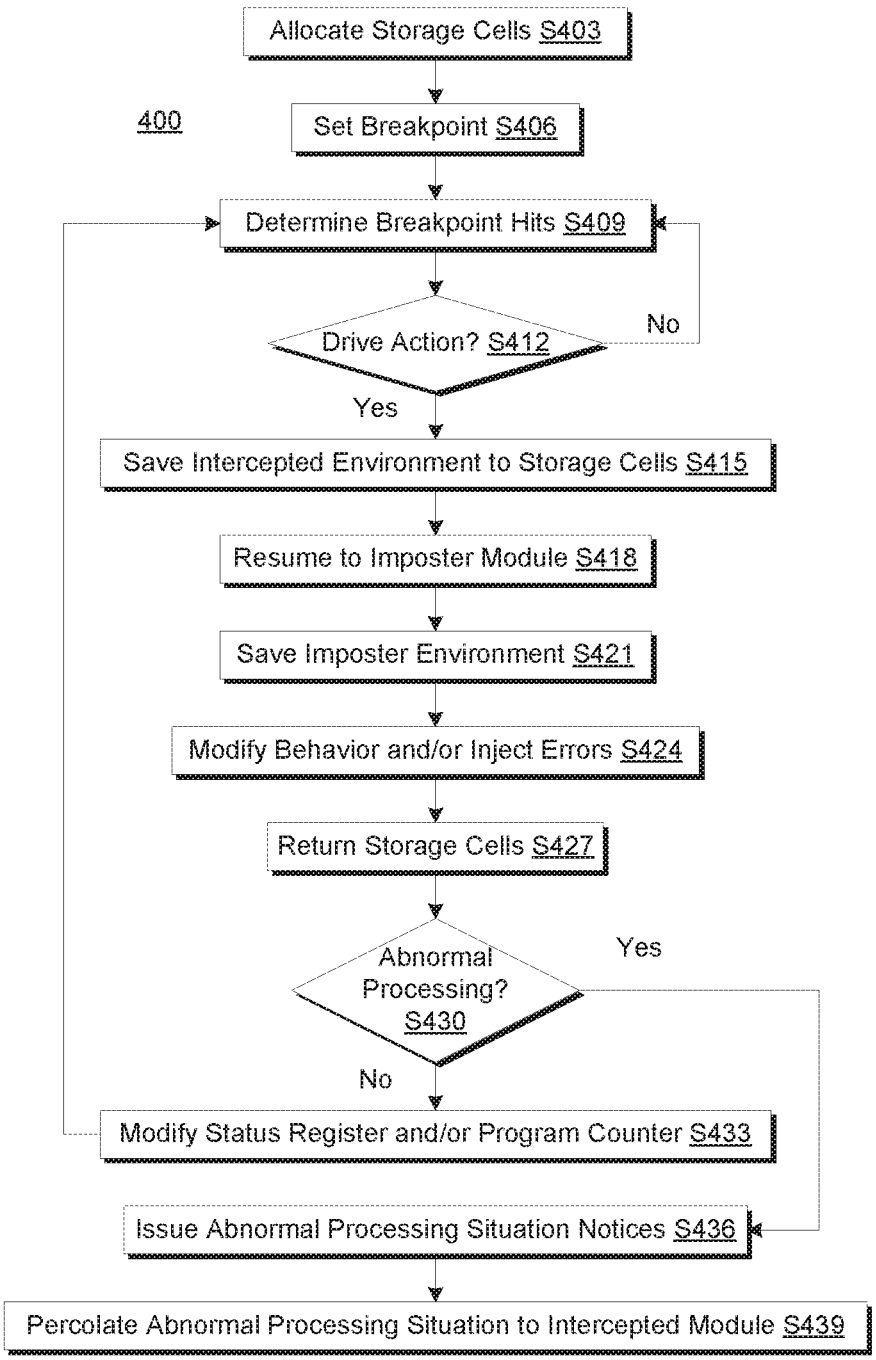
FIG. 4 is a flowchart showing a second embodiment method according to the present invention.

FIG. 4 shows flowchart 400 depicting a method according to the present invention. An example will be used throughout discussion of flowchart 400. In this example, John is determining the robustness of a test module to determine how the test module handles various abnormal processing situations. To perform this, John loads the test module into a computing device and begins processing of the test module with a breakpoint imposter sub-system.

Processing begins at operation S403, where a breakpoint imposter sub-system allocates a set of storage cells. In some embodiments of the present invention, a breakpoint imposter sub-system uses a set of storage cells to transfer information between various modules. In some embodiments of the present invention, a breakpoint imposter sub-system stores environment data of various modules to a set of storage cells. In some embodiments of the present invention, a breakpoint imposter sub-system determines an order of releasing and/or obtaining a set of storage cells. In this example, the breakpoint imposter sub-system obtains a variety of storage cells to save the environment of the test module being tested by John.

Processing proceeds to operation S406, where a breakpoint imposter sub-system sets a breakpoint. In some embodiments of the present invention, a breakpoint imposter sub-system receives, as an input, a set of conditions for a breakpoint. Alternatively, a breakpoint imposter sub-system determines a set of conditions for a breakpoint, such as: (i) a preset; (ii) a variable based, at least in part, on a test module; and/or (iii) a combination of conditions. A condition is sometimes also called a trigger or a flag. In some embodiments of the present invention, a breakpoint imposter sub-system sets a breakpoint using an operator command. In some embodiments of the present invention, an operator command sets a bit in a status register and/or a program counter to indicate that interrupts are enabled. In some embodiments of the present invention, an operator command enables a range of control register instructions to operate a breakpoint. In this example, the breakpoint imposter sub-system receives as an input a condition of a fetch instruction occurring.

In some embodiments of the present invention, a breakpoint is triggered by a hardware event. Hardware events that can trigger a breakpoint include, but are not limited to: (i) an instruction fetch; (ii) a storage alteration; and/or (iii) a successful branch. Alternatively, a breakpoint is triggered by a software event. In some embodiments of the present invention, a software event includes, but is not limited to: (i) an ABEND; (ii) a status message; and/or (iii) an abnormal processing situation. A status message is sometimes also known as an error message. In some embodiments of the present invention, a breakpoint can filter status codes, including, but not limited to: (i) completion codes; (ii) reason codes; and/or (iii) message ID codes.

Processing proceeds to operation S409, where a breakpoint imposter sub-system determines that a breakpoint hits. Hitting a breakpoint is sometimes also called triggering a breakpoint or intercepting a test module. In this example, a breakpoint imposter sub-system determines that an instruction fetch has occurred within the test module. In some embodiments of the present invention, a breakpoint imposter sub-system determines that processing of a test module does not trigger a breakpoint and the breakpoint imposter sub-system terminates processing of the test module. Alternatively, a breakpoint imposter sub-system determines that processing of a test module results in an endless loop of triggering a breakpoint, and the breakpoint imposter sub-system terminates processing based on one or more of: (i) a number of times a breakpoint is triggered; (ii) a percentage of processing power invested in the breakpoint imposter sub-system; and/or (iii) an amount of time the breakpoint imposter sub-system has spent processing the test module.

In some embodiments of the present invention, a breakpoint imposter sub-system introduces a set of testing hooks through a breakpoint.

Processing proceeds to decision operation S412, where a breakpoint imposter sub-system determines whether to drive an action. In this example, the breakpoint imposter sub-system determines to drive an action. In some embodiments of the present invention, a breakpoint imposter sub-system alters a behavior of a test module. An altered behavior of a test module is sometimes caused by an abnormal processing situation. If a breakpoint imposter sub-system determines to drive an action, processing proceeds through the "Yes" branch. If a breakpoint imposter sub-system determines not to drive an action, processing proceeds through the "No" branch. In this example, processing proceeds through the "Yes" branch because the breakpoint imposter sub-system determined to cause a processing delay (drive an action). In some embodiments of the present invention, a breakpoint imposter sub-system determines that a breakpoint does not take an action; distinct from the breakpoint imposter sub-system taking an action. In some embodiments of the present invention, a breakpoint imposter sub-system determines an error or message to be tested using an imposter module.

Following the "No" branch from operation S412, processing returns to operation S409, where a breakpoint imposter sub-system determines that a breakpoint hits. Alternatively, processing terminates at operation S412. In some embodiments of the present invention, a breakpoint imposter sub-system includes a limit on a number of times the breakpoint imposter sub-system determines a breakpoint hits before processing terminates. In some embodiments of the present invention, a limit on a number of times the breakpoint imposter sub-system determines a breakpoint hits is determined as, but is not limited to: (i) a preset; (ii) an input; (iii) a function of computer processing power; (iv) a function of computer processing power percentage; and/or (v) a function of time.

In this example, processing does not proceed through this path. However, if processing of flowchart 400 did proceed to operation through the "No" branch from operation S412, the breakpoint imposter sub-system would resume processing of the test module until a next occurrence of a line of code triggering the breakpoint.

Following the "Yes" branch from operations S412, processing proceeds to operation S415, where a breakpoint imposter sub-system saves an intercepted environment to a set of storage cells. In some embodiments of the present invention, an intercepted environment includes a set of modes and/or a set of registers. In some embodiments of the present invention, an intercepted environment includes an address of a next sequential instruction in a test code. A mode can include an addressing mode (AMODE). In some embodiments of the present invention a set of storage cells include a status register and/or a program counter. In some embodiments of the present invention, a breakpoint imposter sub-system saves an intercepted environment to a set of storage cells.

Processing proceeds to operation S418, where a breakpoint imposter sub-system resumes processing to an imposter module. An imposter module is sometimes also called an imposter routine. In some embodiments of the present invention, a breakpoint imposter sub-system modifies a breakpoint to execute processing on an imposter module, instead of on a test module. In some embodiments of the present invention, modifying a breakpoint includes running an imposter module in an environment of a test module.

Processing proceeds to operation 5421, where a breakpoint imposter sub-system saves an environment of an imposter module. In some embodiments of the present invention, a breakpoint imposter sub-system saves an environment of an imposter module to facilitate a return of processing to a test module. In some embodiments of the present invention, an environment of an imposter module is stored to a set of storage cells.

Processing proceeds to operation 5424, where a breakpoint imposter sub-system causes an abnormal processing situation. In some embodiments of the present invention, an imposter module includes a processing error. In some embodiments of the present invention, an imposter module includes a variety of processing errors, such as modifying a storage, changing a set of registers, and/or causing an ABEND. In some embodiments of the present invention, an imposter module causes a delay in processing. In some embodiments of the present invention, a breakpoint imposter sub-system simulates a set of problems a customer could encounter.

Processing proceeds to operation 5427, where a breakpoint imposter sub-system returns a set of storage cells. In some embodiments of the present invention, storage cells contain an environment of a test module and/or an environment of an imposter module. In some embodiments of the present invention, a breakpoint imposter sub-system uses a set of storage cells to move processing from one module to another module. In some embodiments of the present invention, a breakpoint imposter sub-system returns a set of storage cells to allow processing to continue under an environment of a prior module.

Processing proceeds to decision operation 5430, where a breakpoint imposter sub-system determines whether processing reached an abnormal processing situation. If a breakpoint imposter sub-system determines an abnormal processing situation occurred, processing proceeds through the "Yes" branch. If a breakpoint imposter sub-system determines an abnormal processing situation did not occur, processing proceeds through the "No" branch. In this example, processing proceeds through the "Yes" branch because the breakpoint imposter sub-system determined an abnormal processing situation occurred.

Following the "No" branch from operation 5430, processing proceeds to operation S433, where a breakpoint imposter sub-system modifies a status register and/or a program counter. In some embodiments of the present invention, a breakpoint imposter sub-system modifies a status register and/or a program counter to return processing to a test module. In some embodiments of the present invention, a status register and/or a program counter include a linkage stack. In some embodiments of the present invention, a breakpoint imposter sub-system issues a program return instruction to resume processing of a test module.

Processing returns to operation S409, where a breakpoint imposter sub-system determines that a breakpoint hits. Alternatively, processing terminates at operation S433. In some embodiments of the present invention, a breakpoint imposter sub-system includes a limit on a number of times the breakpoint imposter sub-system determines a breakpoint hits before processing terminates. In some embodiments of the present invention, a limit on a number of times the breakpoint imposter sub-system determines a breakpoint hits is determined as, but is not limited to: (i) a preset; (ii) an input; (iii) a function of computer processing power; (iv) a function of computer processing power percentage; and/or (v) a function of time.

Following the "Yes" branch from operation 5430, processing proceeds to operation S436 where a breakpoint imposter sub-system issues an abnormal processing situation notice.

Processing terminates at operation 5439, where a breakpoint imposter sub-system percolates an abnormal processing situation to an intercepted module. In some embodiments of the present invention, a breakpoint imposter sub-system percolates an abnormal processing situation by causing processing to return to a test module. In some embodiments of the present invention, a breakpoint imposter sub-system percolates an abnormal processing situation by causing processing to return to a recovery code of a test module.

In some embodiments of the present invention, a breakpoint imposter sub-system determines that processing a first computer module triggers a breakpoint. In some embodiments of the present invention, a breakpoint imposter sub-system moves processing from a first computer module to a second computer module. In some embodiments of the present invention, a breakpoint imposter sub-system returns processing to a first computer module from a second computer module. In some embodiments of the present invention, a breakpoint imposter sub-system saves an environment to a set of storage cells. In some embodiments of the present invention, an environment relates to a first computer module. In some embodiments of the present invention, an environment includes a setting, which is one or more of a status register and/or a program counter. In some embodiments of the present invention, a breakpoint imposter sub-system alters a setting of an environment. In some embodiments of the present invention, a breakpoint imposter sub-system runs a second computer module in an environment of a first computer module. In some embodiments of the present invention, a breakpoint imposter sub-system determines an abnormal processing situation occurs during processing of a second computer module. In some embodiments of the present invention, a breakpoint imposter sub-system determines a response of a first computer module to an abnormal processing situation. In some embodiments of the present invention, a breakpoint imposter sub-system returns processing to a first computer module from a second computer module while retaining an abnormal processing situation. In some embodiments of the present invention, a breakpoint imposter sub-system creates a second computer module, wherein the second computer module induces an abnormal processing situation.

Some embodiments of the present invention may include one, or more, of the following features, characteristics, and/or advantages: (i) a flexible, lightweight solution that does not alter a test module; (ii) debugging every line of a test module; (iii) not requiring prior knowledge of a test module to determine potential areas to debug; (iv) debugging a test module on actual hardware; (v) debugging a test module in a real-world environment; and/or (vi) debugging a test module as in an "off-the-shelf" format.

Some embodiments of the present invention may include one, or more, of the following features, characteristics, and/or advantages: (i) not adding any lines of code to a test module; (ii) not altering a size of a test module; (iii) not altering a flow (or path length) of a test module; (iv) not requiring a test module to be recompiled; (v) not adding any testing hooks to a test module; and/or (vi) retaining a test module behavior through testing.

Some embodiments of the present invention may include one, or more, of the following features, characteristics, and/or advantages: (i) injects an error into an unaltered test module using a breakpoint; (ii) debugging a test module on a native system using a breakpoint; (iii) expanding abilities and uses of a breakpoint; (iv) intercepting (interrupting) a test module using a breakpoint; (v) resuming processing from a test module to an imposter module; (vi) employing function unavailable to a breakpoint through the use of an imposter module; and/or (vii) enhancing a set of capabilities for a breakpoint.

Some embodiments of the present invention may include one, or more, of the following features, characteristics, and/or advantages: (i) an imposter module environment is less restrictive than a breakpoint environment; (ii) an imposter module can execute similar instructions to a test module; and/or (iii) an imposter module can execute a set of functions including, but not limited to, delay processing (WAIT), set an interval timer (STIMER), write to operator (WTO), and/or abnormal termination (ABEND).

Some embodiments of the present invention may include one, or more, of the following features, characteristics, and/or advantages: (i) setting a breakpoint; (ii) allocating a set of storage cells to pass data to an imposter module; (iii) determining a breakpoint is triggered (driven); (iv) evaluating whether an action should be taken; (v) resuming an intercepted test module, responsive to an evaluation that no action will be taken; (vi) saving a test module environment (e.g., status register, program counter, etc.) to a storage cell in the set of storage cells, responsive to an evaluation that an action will be taken; (vii) changing a status register and/or a program counter to point to an imposter routine such that processing resumes on the imposter routine in an expected mode (e.g., a key, an addressing mode (AMODE), an address space control (ASC) mode, etc.); (viii) using a branch and stack register (BAKR) instruction to save an imposter module environment to a linkage stack; (ix) acting, through an imposter module to call a set of system services, call other computer code, modify storage, modify a linkage stack register of a test module, etc.; and/or (x) returning processing to a test module by updating a linkage stack status register and/or a linkage stack program counter (including a location and addressing mode), returning data to a set of storage cells, and/or issuing program return (PR) instructions.

Some embodiments of the present invention may include one, or more, of the following features, characteristics, and/or advantages: (i) not having advance knowledge of error injection points (sometimes also known as critical points); (ii) not requiring a test module to be rebuilt or recompiled after testing (each of which can change characteristics of the test module); (iii) not increasing the size of a test module; and/or (iv) not slowing processing of a test module due to extended run-time checks.

Some embodiments of the present invention may include one, or more, of the following features, characteristics, and/or advantages: (i) dynamically intercepting an executed test module; (ii) not modifying a test module or a product; (iii) employing a variety of options to debug a test module; (iv) decreasing temporal restrictions on debugging a test module; (v) debugging a test module based on a variety of lines of code in a test module; (vi) debugging a test module based on a variety of locations within a test module; and/or (vii) retaining a test module performance without altering the test module.

Some embodiments of the present invention may include one, or more, of the following features, characteristics, and/or advantages: (i) simulating rare operating conditions; (ii) simulating error conditions; (iii) dynamically injecting an error without changing a test module; (iv) not requiring post-testing cleanup of a test module; and/or (v) not requiring management of potential error sites.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:
1. A computer program product comprising:
a computer readable storage medium having stored thereon:
first instructions executable by a device to cause the device to allocate a set of storage cells for a first computer module;
second instructions executable by a device to cause the device to set a set of serviceability level indication processing program event recording (SLIP PER) traps in the first computer module;
third instructions executable by a device to cause the device to determine a first environment for the first computer module, wherein:
the first environment includes a first set of settings, and
the first set of settings includes:
a first status register, and
a first program counter;
fourth instructions executable by a device to cause the device to save the first environment to the set of storage cells;
fifth instructions executable by a device to cause the device to create a second computer module, wherein the second computer module induces:
an insufficient memory abnormal termination (ABEND),
a warning,
a service message, and
an error message;
sixth instructions executable by a device to cause the device to process the first computer module;
seventh instructions executable by a device to cause the device to, responsive to sixth instructions to process the first computer module, determine that a first SLIP PER trap in the set of SLIP PER traps is triggered;
eighth instructions executable by a device to cause the device to pause the first computer module;
ninth instructions executable by a device to cause the device to process a second computer module in the first environment;
tenth instructions executable by a device to cause the device to determine a second environment for the second computer module, wherein:
the second environment includes a second set of settings, and
the second set of settings includes:
a second status register, and
a second program counter;
eleventh instructions executable by a device to cause the device to save the second environment to the set of storage cells;
twelfth instructions executable by a device to cause the device to, responsive to ninth instructions to process the second computer module, determine the insufficient memory ABEND is triggered;
thirteenth instructions executable by a device to cause the device to resume processing of the first computer module in the first environment;
fourteenth instructions executable by a device to cause the device to, responsive to thirteenth instructions to resume processing of the first computer module, retain the insufficient memory ABEND;
fifteenth instructions executable by a device to cause the device to determine a response of the first computer module to the insufficient memory ABEND;

sixteenth instructions executable by a device to cause the device to, responsive to fifteenth instructions to determine the response of the first computer module to the insufficient memory ABEND, issue an ABEND notice; and seventeenth instructions executable by a device to cause the device to, responsive to sixteenth instructions to determine the response of the first computer module to the insufficient memory ABEND, percolate the insufficient memory ABEND to the first computer module.

\* \* \* \* \*